(12) United States Patent
Kapoor

(10) Patent No.: US 12,437,247 B1
(45) Date of Patent: *Oct. 7, 2025

(54) COMPUTERIZED WORK-ITEM SELECTION AND PROGRESS TRACKING BASED ON A SET OF PRIORITIZED COMPUTER-EXECUTABLE RULES

(71) Applicant: Digital.ai Software, Inc., Burlington, MA (US)

(72) Inventor: Rahul Kapoor, Bellevue, WA (US)

(73) Assignee: Digital.ai Software, Inc., Burlington, MA (US)

( * ) Notice: Subject to any disclaimer, the term of this patent is extended or adjusted under 35 U.S.C. 154(b) by 34 days.

This patent is subject to a terminal disclaimer.

(21) Appl. No.: 18/388,141

(22) Filed: Nov. 8, 2023

Related U.S. Application Data

(63) Continuation of application No. 17/535,370, filed on Nov. 24, 2021, now Pat. No. 11,847,594.

(51) Int. Cl.
*G06Q 10/0631* (2023.01)
*G06F 9/451* (2018.01)
(Continued)

(52) U.S. Cl.
CPC ....... *G06Q 10/06313* (2013.01); *G06F 9/451* (2018.02); *G06F 3/04817* (2013.01); *G06F 3/0482* (2013.01); *G06F 2203/04803* (2013.01)

(58) Field of Classification Search
CPC .............. G06Q 10/06313; G06F 9/451; G06F 3/04817; G06F 3/0482; G06F 2203/04803
See application file for complete search history.

(56) References Cited

U.S. PATENT DOCUMENTS 8,463,591 B1  6/2013  Chang et al.
2002/0054117 A1*  5/2002  van Dantzich ....... H04L 51/224
                                          715/766
(Continued)

FOREIGN PATENT DOCUMENTS

CN   109347536 A   2/2019

OTHER PUBLICATIONS

SAFe, Scaled Agile, "Weighted Shortest Job First," https://www.scaledagileframework.com/wsjf/, Feb. 10, 2021, 6 pages.
(Continued)

*Primary Examiner* — Ziaul A Chowdhury
(74) *Attorney, Agent, or Firm* — Rahman LLC

(57) ABSTRACT

Generating an output prioritized list of computerized work-items for prioritizing work based on a set of prioritized computer-executable rules includes a structured way of associating contributions and expenses with computerized work-items and enhancing current technological processes of selecting computerized work-items to meet prioritized computer-executable rules. The method includes determining an electronic priority order of each of contribution sub-components and expense sub-components based on prioritized computer-executable rules, generating a tuple having contribution sub-components and expense sub-components for each of the computerized work-items, sorting the computerized work-items of the input master list in descending order of the contribution and expense sub-component tuples to obtain a sorted list of computerized work-items, and traversing the sorted list of computerized work-items to generate the output prioritized list of computerized work-items for prioritizing work based on prioritized computer-executable rules.

20 Claims, 9 Drawing Sheets

(51) Int. Cl.
　　　*G06F 3/04817*　　　(2022.01)
　　　*G06F 3/0482*　　　　(2013.01)

(56)　　　　　　References Cited

U.S. PATENT DOCUMENTS

| | | |
|---|---|---|
| 2006/0190944 A1 | 8/2006 | Moon et al. |
| 2007/0174161 A1 | 7/2007 | Bullock et al. |
| 2008/0196000 A1 | 8/2008 | Fernandez-Ivern et al. |
| 2011/0087522 A1 | 4/2011 | Beaty, II et al. |
| 2015/0006260 A1 | 1/2015 | Harris |
| 2017/0200133 A1 | 7/2017 | Werner et al. |
| 2017/0213171 A1* | 7/2017 | Dubash ............ G06Q 10/06314 |
| 2020/0159525 A1* | 5/2020 | Bhalla .................. G06F 21/577 |
| 2020/0371823 A1* | 11/2020 | Magazine ............. G06F 9/4451 |
| 2021/0256474 A1* | 8/2021 | Vlasov ................ G06F 3/04817 |
| 2022/0027830 A1 | 1/2022 | Mouawad |
| 2022/0027833 A1* | 1/2022 | Miara ..................... G06F 40/40 |
| 2023/0057537 A1* | 2/2023 | Mappus ............. G06F 18/2113 |

OTHER PUBLICATIONS

Lee, T., et al., "Gravitational Search Algorithm Optimization for Bi-Objective Flow Shop Scheduling using Weighted Dispatching Rules," 2017 7th IEEE International Conference on Control System, Computing and Engineering (ICCSCE), Penang, Malaysia, Nov. 24-26, 2017, pp. 127-132.

Land, S., et al., "Lean Six Sigma Techniques and DMAIC," in Practical Support for Lean Six Sigma Software Process Definition: Using IEEE Software Engineering Standards, IEEE, 2008, pp. 173-231, doi: 10.1002/9780470289969, ch7, pp. 173-231.

\* cited by examiner

OBTAINING THE SET OF PRIORITIZED COMPUTER-EXECUTABLE RULES, A DEFAULT ELECTRONIC PRIORITY ORDER OF (A) A PLURALITY OF CONTRIBUTION SUB-COMPONENTS AND (B) A PLURALITY OF EXPENSE SUB-COMPONENTS THAT ARE ASSOCIATED WITH THE PLURALITY OF COMPUTERIZED WORK-ITEMS, A PLURALITY OF RESOURCE CATEGORIES, AND A MAXIMUM RESOURCE UNIT LIMIT FOR EACH OF THE PLURALITY OF RESOURCE CATEGORIES, WHEREIN EACH COMPUTERIZED WORK-ITEM HAS AN ESTIMATE OF REQUIRED RESOURCE UNITS FOR EACH RESOURCE CATEGORY THAT IS DETERMINED USING A PRODUCT OF A NUMBER OF RESOURCES AND A NUMBER OF TIME UNITS

402

DETERMINING AN ELECTRONIC PRIORITY ORDER OF EACH OF THE PLURALITY OF CONTRIBUTION SUB-COMPONENTS AND THE PLURALITY OF EXPENSE SUB-COMPONENTS BASED ON A PRIORITIZED COMPUTER-EXECUTABLE RULE CORRESPONDING TO THE PLURALITY OF CONTRIBUTION SUB-COMPONENTS AND EXPENSE SUB-COMPONENTS, WHEREIN A CONTRIBUTION SUB-COMPONENT OR EXPENSE SUB-COMPONENT AT THE TOP IN THE ELECTRONIC PRIORITY ORDER CORRESPONDS TO A COMPUTER-EXECUTABLE RULE HAVING A HIGHEST PRIORITY , WHEREIN A CONTRIBUTION SUB-COMPONENT OR EXPENSE SUB-COMPONENT WITH NO ASSOCIATED PRIORITIZED COMPUTER-EXECUTABLE RULE IS ASSIGNED A LOWER PRIORITY THAN THE PLURALITY OF CONTRIBUTION SUB-COMPONENTS OR EXPENSE SUB-COMPONENTS THAT ARE ASSOCIATED WITH AT LEAST ONE OF THE SET OF PRIORITIZED COMPUTER-EXECUTABLE RULES, WHEREIN THE LOWER PRIORITY IS DERIVED FROM THE DEFAULT ELECTRONIC PRIORITY ORDER

404

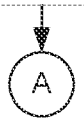

FIG. 4A

GENERATING A TUPLE COMPRISING CONTRIBUTION SUB-COMPONENTS AND EXPENSE SUB-COMPONENTS FOR EACH OF THE PLURALITY OF COMPUTERIZED WORK-ITEMS OF THE INPUT MASTER LIST, WHEREIN CONTRIBUTION SUB-COMPONENTS AND EXPENSE SUB-COMPONENTS IN THE TUPLE ARE ARRANGED BASED ON THE ELECTRONIC PRIORITY ORDER
406

SORTING THE PLURALITY OF COMPUTERIZED WORK-ITEMS OF THE INPUT MASTER LIST IN DESCENDING ORDER OF THE CONTRIBUTION AND EXPENSE SUB-COMPONENT TUPLES TO OBTAIN A SORTED LIST OF COMPUTERIZED WORK-ITEMS, WHEREIN A COMPUTERIZED WORK-ITEM HAVING SAME VALUE UP TO A NTH (A POSITIVE INTEGER) CONTRIBUTION SUB-COMPONENT OR EXPENSE SUB-COMPONENT OF THE COMPUTERIZED WORK-ITEM IS SORTED BY A VALUE OF $(N+1)^{TH}$ CONTRIBUTION SUB-COMPONENT OR EXPENSE SUB-COMPONENT OF THE COMPUTERIZED WORK-ITEM
408

TRAVERSING THE SORTED LIST OF COMPUTERIZED WORK-ITEMS TO GENERATE THE OUTPUT PRIORITIZED LIST OF COMPUTERIZED WORK-ITEMS FOR PRIORITIZING WORK BASED ON PRIORITIZED COMPUTER-EXECUTABLE RULES, SELECTING COMPUTERIZED WORK-ITEMS DURING TRAVERSAL WHILE ENSURING CUMULATIVE RESOURCE UNITS REQUIRED FOR EACH RESOURCE CATEGORY TO COMPLETE THE OUTPUT PRIORITIZED LIST OF COMPUTERIZED WORK-ITEMS ARE LESS THAN THE MAXIMUM RESOURCE UNIT LIMIT FOR EACH RESOURCE CATEGORY
410

FIG. 4B

| CLIENT DEVICES 102A-N | | SOFTWARE DEVELOPMENT DEVICE 110 |
|---|---|---|

SORTING THE PLURALITY OF COMPUTERIZED WORK-ITEMS OF THE INPUT MASTER LIST IN DESCENDING ORDER OF THE CONTRIBUTION AND EXPENSE SUB-COMPONENT TUPLES TO OBTAIN A SORTED LIST OF COMPUTERIZED WORK-ITEMS, WHEREIN A COMPUTERIZED WORK-ITEM HAVING SAME VALUE UP TO A NTH (A POSITIVE INTEGER) CONTRIBUTION SUB-COMPONENT OR EXPENSE SUB-COMPONENT OF THE COMPUTERIZED WORK-ITEM IS SORTED BY A VALUE OF (N+1)$^{TH}$ CONTRIBUTION SUB-COMPONENT OR EXPENSE SUB-COMPONENT OF THE COMPUTERIZED WORK-ITEM — 508

TRAVERSING THE SORTED LIST OF COMPUTERIZED WORK-ITEMS TO GENERATE THE OUTPUT PRIORITIZED LIST OF COMPUTERIZED WORK-ITEMS, SELECTING COMPUTERIZED WORK-ITEMS DURING TRAVERSAL WHILE ENSURING CUMULATIVE RESOURCE UNITS REQUIRED FOR EACH RESOURCE CATEGORY TO COMPLETE THE OUTPUT PRIORITIZED LIST OF COMPUTERIZED WORK-ITEMS ARE LESS THAN THE MAXIMUM RESOURCE UNIT LIMIT FOR EACH RESOURCE CATEGORY — 510

TRANSMITTING THE OUTPUT PRIORITIZED LIST OF COMPUTERIZED WORK-ITEMS FOR PRIORITIZING WORK BASED ON PRIORITIZED COMPUTER-EXECUTABLE RULES — 512

FIG. 5B

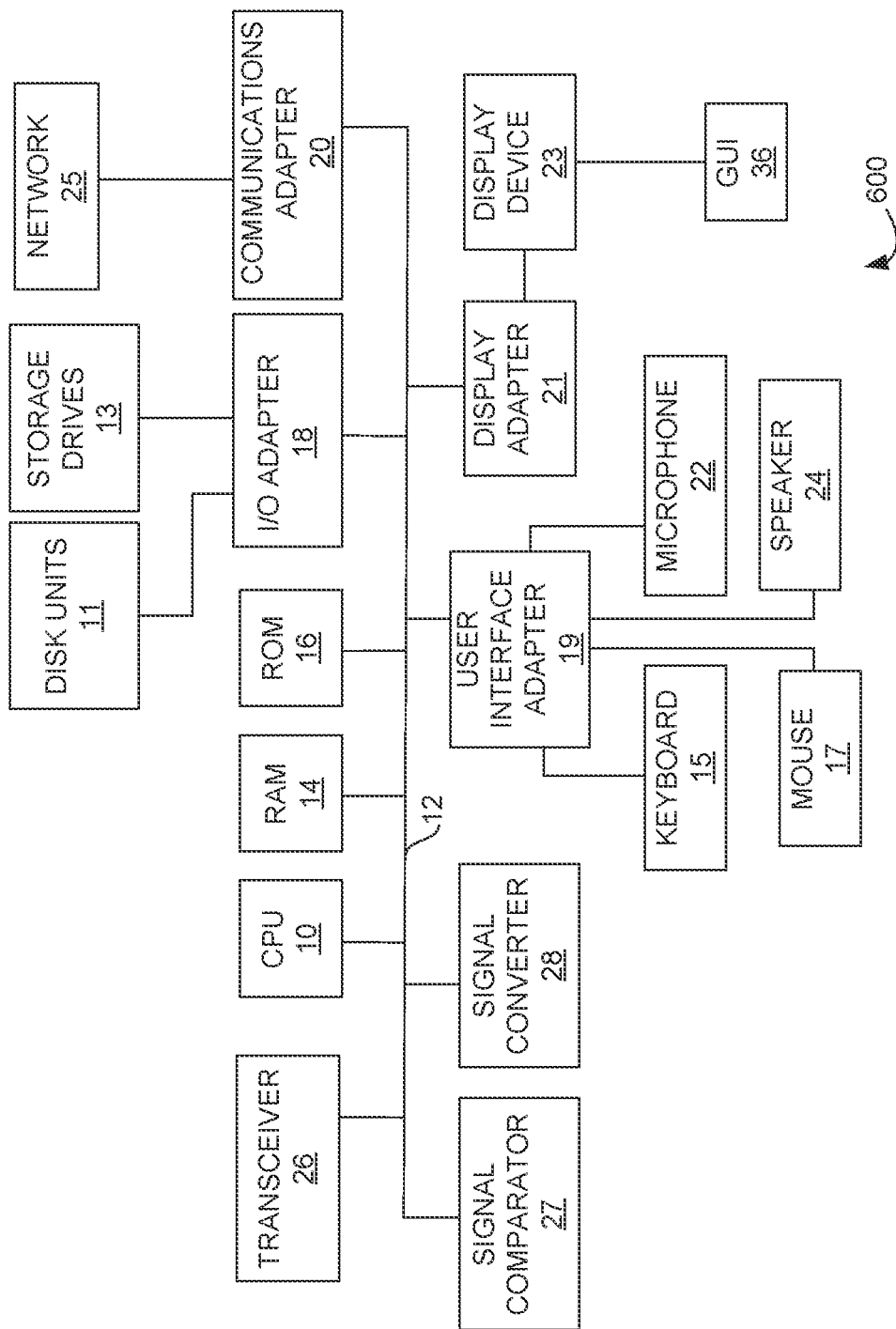

COMPUTERIZED WORK-ITEM SELECTION AND PROGRESS TRACKING BASED ON A SET OF PRIORITIZED COMPUTER-EXECUTABLE RULES

CROSS-REFERENCE TO RELATED APPLICATIONS

This application is a continuation of U.S. patent application Ser. No. 17/535,370, filed on Nov. 24, 2021, entitled "Computerized Work-Item Selection and Progress Tracking Based on a Set of Prioritized Computer-Executable Rules", and is further related to U.S. patent application Ser. No. 17/535,388, filed Nov. 24, 2021, entitled "Computerized Work-Item Selection and Progress Tracking Based on a Set of Weighted Computer-Executable Rules" and U.S. patent application Ser. No. 17/535,411, filed Nov. 24, 2021, entitled "Computerized Work-Item Selection and Progress Tracking Based on a Set of Quantified Computer-Executable Rules", the complete disclosures of which, in their entireties, are herein incorporated by reference.

BACKGROUND

Technical Field

The embodiments herein generally relate to techniques for the generation of a prioritized list of computerized work-items for prioritizing computer application workflow based on a set of prioritized computer-executable rules.

Description of the Related Art

In current generation software development tools, it is very hard to associate outcomes of various objectives of an organization with computerized work-items such as features, defects, or technical debt being planned or prioritize computerized work-items based on overall objectives of the organization, as the desired objectives are not tracked in software development tools and computerized work-items do not have any association with the objectives. Typically, computerized work-item selection is based on priority, size, and available resources where priority attempts to capture customer and organization value in an ad hoc fashion. The reason the setting of a priority is somewhat ad hoc is that it is hard to quantify the impact of computerized work-items towards the objectives of the organization. Similarly, once computerized work-items are being executed, progress is typically measured by tracking outputs, for example, features shipped, defects resolved, or story points completed and there is no connection to the desired outcomes of the organization such as increase in revenue or product adoption or customer satisfaction. The aforementioned problem exists not just in software development teams but for any unit that has to work on various computerized work-items within an organization.

The large number of computerized work-items having multiple contribution and expense sub-components, and the need for multiple resources from a plurality of different resource categories to complete the computerized work-items means that any intelligent method to create a prioritized list of computerized work-items based on prioritized computer-executable rules and resource type/limit considerations would be computationally challenging.

In an existing approach, a weighted shortest job first (WSJF) method is used optimize computerized work-items or collections of computerized work-items based on a score defined to be the "cost of delay" divided by "job duration", where the "cost of delay" is "cost of delay per unit time" multiplied by "delay duration" where "delay duration" is the sum of durations of preceding Job's. A modification of the WSJF method approximates "job duration" as "job size" & "cost of delay" as the sum of "user business value"+"time criticality"+"risk reduction and/or opportunity enablement". There is however no decomposition of contributions and expenses associated with a prioritized objective into constituent sub-components, or even a clear distinction between contribution sub-components and expense sub-components. As there is no association of granular contributions and expenses with computerized work-items, the selection of computerized work-items is primarily driven by an estimate of the cost of not doing the computerized work-items versus based on a more holistic consideration of an organization's objectives. Further, the modification of the WSJF does not consider different resource categories, nor does it try to minimize resources or computerized work-items while meeting an organization's objectives.

Accordingly, there arises a need to address the aforementioned technical drawbacks in existing technologies for generation of a prioritized list of computerized work-items for prioritizing work based on a set of prioritized computer-executable rules.

SUMMARY

In view of the foregoing, there is provided one or more non-transitory computer readable storage medium storing a sequence of instructions, which when executed by a processor, causes processing of an input master list of a plurality of computerized work-items to generate an output prioritized list of the plurality of computerized work-items selected from the input master list, for prioritizing work based on a set of prioritized computer-executable rules, the sequence of instructions comprising (a) obtaining the set of prioritized computer-executable rules, a default electronic priority order of (i) a plurality of contribution sub-components and (ii) a plurality of expense sub-components that are associated with the plurality of computerized work-items, a plurality of resource categories, and a maximum resource unit limit for each of the plurality of resource categories, wherein each computerized work-item has an estimate of required resource units for each resource category that is determined using a product of a number of resources and a number of time units, (b) determining an electronic priority order of each of the plurality of contribution sub-components and the plurality of expense sub-components based on a prioritized computer-executable rule corresponding to the plurality of contribution sub-components and expense sub-components, wherein a contribution sub-component or expense sub-component at the top in the electronic priority order corresponds to a computer-executable rule having a highest priority, wherein a contribution sub-component or expense sub-component with no associated prioritized computer-executable rule is assigned a lower priority than the plurality of contribution sub-components or expense sub-components that are associated with at least one of the set of prioritized computer-executable rules, wherein the lower priority is derived from the default electronic priority order, (c) generating a tuple comprising contribution sub-components and expense sub-components for each of the plurality of computerized work-items of the input master list, wherein contribution sub-components and expense sub-components in the tuple are arranged based on the electronic priority order, (d) sorting the plurality of computerized work-items of the input master list in descending order of the contribution and expense sub-component tuples to obtain a sorted list of computerized work-items, wherein a computerized work-item having same value up to a nth (a positive integer) contribution sub-component or expense sub-component of the computerized work-item is sorted by a value of $(n+1)^{th}$ contribution sub-component or expense sub-component of the computerized work-item, and (e) traversing the sorted list of computerized work-items to generate the output prioritized list of computerized work-items for prioritizing work based on prioritized computer-executable rules, selecting computerized work-items during traversal while ensuring cumulative resource units required for each resource category to complete the output prioritized list of computerized work-items are less than the maximum resource unit limit for each resource category.

In some embodiments, the non-transitory computer readable storage medium storing the sequence of instructions, have one uniform resource category with the plurality of computerized work-items having an estimate specified in a number of resources, which when executed by a processor, causes traversal of the sorted list of computerized work-items to generate the output prioritized list of computerized work-items while ensuring a cumulative number of resources required to complete the output prioritized list of computerized work-items is less than a maximum number of resources.

In some embodiments, the non-transitory computer readable storage medium storing the sequence of instructions, have one uniform resource category with the plurality of computerized work-items having an estimate specified in time units, which when executed by a processor, causes traversal of the sorted list of computerized work-items to generate the output prioritized list of computerized work-items while ensuring cumulative time required to complete the output prioritized list of computerized work-items is less than a maximum time unit limit.

In some embodiments, the non-transitory computer readable storage medium storing the sequence of instructions, which when executed by the processor, further causes tracking of progress of the plurality of computerized work-items by determining at least one of an overall contribution reached and an overall expense accumulated using standardized bucket values derived from a computerized bucket equivalence map.

In some embodiments, the non-transitory computer readable storage medium storing the sequence of instructions, which when executed by the processor, further causes tracking of progress of the plurality of computerized work-items by determining at least one of an overall contribution reached or an overall expense accumulated using comparable bucket values associated with the plurality of computerized work-items.

In some embodiments, the non-transitory computer readable storage medium storing the sequence of instructions, which when executed by the processor, further causes refining of an estimate of a contribution sub-component in a bucket value or a numerical value of future planned computerized work-items using actual realized contribution obtained from at least one of (a) a usage telemetry, (b) a finer grained usage telemetry and (c) a quality telemetry.

In some embodiments, the non-transitory computer readable storage medium storing the sequence of instructions, which when executed by the processor, further causes refining of an estimate of an expense sub-component in a bucket value or a numerical value of future planned computerized work-items based on actual expenses incurred in performing similar computerized work-items.

In some embodiments, the non-transitory computer readable storage medium storing the sequence of instructions, which when executed by the processor, causes the steps of (a) obtaining, using an input master list pane of a graphical user interface, the input master list of a plurality of computerized work-items, (b) processing a selection of computer-executable rules using a search icon and add icon based on inputs received at a rules initialization pane of the graphical user interface, and (c) displaying, at an output prioritized list pane of the user interface, the output prioritized list of computerized work-items for prioritizing work based on prioritized computer-executable rules.

Another embodiment provides a software development device that causes processing of an input master list of a plurality of computerized work-items to generate an output prioritized list of the plurality of computerized work-items selected from the input master list, for prioritizing work based on a set of prioritized computer-executable rules, the device includes a processor and a memory that stores a set of instructions, which when executed by the processor, performs the steps of processing of an input master list of a plurality of computerized work-items to generate an output prioritized list of the plurality of computerized work-items selected from the input master list, for prioritizing work based on a set of prioritized computer-executable rules, the sequence of instructions include (a) obtaining the set of prioritized computer-executable rules, a default electronic priority order of (i) a plurality of contribution sub-components and (ii) a plurality of expense sub-components that are associated with the plurality of computerized work-items, a plurality of resource categories, and a maximum resource unit limit for each of the plurality of resource categories, wherein each computerized work-item has an estimate of required resource units for each resource category that is determined using a product of a number of resources and a number of time units, (b) determining an electronic priority order of each of the plurality of contribution sub-components and the plurality of expense sub-components based on a prioritized computer-executable rule corresponding to the plurality of contribution sub-components and expense sub-components, wherein a contribution sub-component or expense sub-component at the top in the electronic priority order corresponds to a computer-executable rule having a highest priority, wherein a contribution sub-component or expense sub-component with no associated prioritized computer-executable rule is assigned a lower priority than the plurality of contribution sub-components or expense sub-components that are associated with at least one of the set of prioritized computer-executable rules, wherein the lower priority is derived from the default electronic priority order, (c) generating a tuple comprising contribution sub-components and expense sub-components for each of the plurality of computerized work-items of the input master list, wherein contribution sub-components and expense sub-components in the tuple are arranged based on the electronic priority order, (d) sorting the plurality of computerized work-items of the input master list in descending order of the contribution and expense sub-component tuples to obtain a sorted list of computerized work-items, wherein a computerized work-item having same value up to a nth (a positive integer) contribution sub-component or expense sub-component of the computerized work-item is sorted by a value of $(n+1)^{th}$ contribution sub-component or expense sub-component of the computerized work-item, and (e) traversing the sorted list of computerized work-items to generate the output prioritized list of computerized work-items for prioritizing work based on prioritized computer-executable rules, selecting computerized work-items during traversal while ensuring cumulative resource units required for each resource category to complete the output prioritized list of computerized work-items are less than the maximum resource unit limit for each resource category.

In some embodiments, there is one uniform resource category with the plurality of computerized work-items having an estimate specified in number of resources, and the software development device traverses the sorted list of computerized work-items to generate the output prioritized list of computerized work-items while ensuring cumulative number of resources required to complete the output prioritized list of computerized work-items is less than a maximum number of resources.

In some embodiments, there is one uniform resource category with the plurality of computerized work-items having an estimate specified in time units and the software development device traverses the sorted list of computerized work-items to generate the output prioritized list of computerized work-items while ensuring cumulative time required to complete the output prioritized list of computerized work-items is less than a maximum time unit limit.

In some embodiments, the software development device tracks progress of the plurality of computerized work-items by determining at least one of an overall contribution reached and an overall expense accumulated using standardized bucket values derived from a computerized bucket equivalence map.

In some embodiments, the software development device tracks progress of the plurality of computerized work-items by determining at least one of an overall contribution reached or an overall expense accumulated using comparable bucket values associated with the plurality of computerized work-items.

In some embodiments, the software development device refines an estimate of a contribution sub-component in a bucket value or a numerical value of future planned computerized work-items using actual realized contribution obtained from at least one of (a) a usage telemetry, (b) a finer grained usage telemetry, and (c) a quality telemetry.

In some embodiments, the software development device refines an estimate of an expense sub-component in a bucket value or a numerical value of future planned computerized work-items based on actual expenses incurred in performing similar computerized work-items.

In some embodiments, software development device includes a graphical user interface that causes the steps of (a) obtaining, using an input master list pane of the graphical user interface, the input master list of a plurality of computerized work-items, (b) processing a selection of computer-executable rules using a search icon and add icon based on inputs received at a rules initialization pane of the graphical user interface, and (c) displaying, at an output prioritized list pane of the user interface, the output prioritized list of computerized work-items for prioritizing work based on prioritized computer-executable rules.

Another embodiment herein provides a method of processing of an input master list of a plurality of computerized work-items to generate an output prioritized list of the plurality of computerized work-items selected from the input master list, for prioritizing work based on a set of prioritized computer-executable rules. The method includes processing of an input master list of a plurality of computerized work-items to generate an output prioritized list of the plurality of computerized work-items selected from the input master list, for prioritizing work based on a set of prioritized computer-executable rules, the sequence of instructions include (a) obtaining the set of prioritized computer-executable rules, a default electronic priority order of (i) a plurality of contribution sub-components and (ii) a plurality of expense sub-components that are associated with the plurality of computerized work-items, a plurality of resource categories, and a maximum resource unit limit for each of the plurality of resource categories, wherein each computerized work-item has an estimate of required resource units for each resource category that is determined using a product of a number of resources and a number of time units, (b) determining an electronic priority order of each of the plurality of contribution sub-components and the plurality of expense sub-components based on a prioritized computer-executable rule corresponding to the plurality of contribution sub-components and expense sub-components, wherein a contribution sub-component or expense sub-component at the top in the electronic priority order corresponds to a computer-executable rule having a highest priority, wherein a contribution sub-component or expense sub-component with no associated prioritized computer-executable rule is assigned a lower priority than the plurality of contribution sub-components or expense sub-components that are associated with at least one of the set of prioritized computer-executable rules, wherein the lower priority is derived from the default electronic priority order, (c) generating a tuple comprising contribution sub-components and expense sub-components for each of the plurality of computerized work-items of the input master list, wherein contribution sub-components and expense sub-components in the tuple are arranged based on the electronic priority order, (d) sorting the plurality of computerized work-items of the input master list in descending order of the contribution and expense sub-component tuples to obtain a sorted list of computerized work-items, wherein a computerized work-item having same value up to a nth (a positive integer) contribution sub-component or expense sub-component of the computerized work-item is sorted by a value of $(n+1)^{th}$ contribution sub-component or expense sub-component of the computerized work-item, and (e) traversing the sorted list of computerized work-items to generate the output prioritized list of computerized work-items for prioritizing work based on prioritized computer-executable rules, selecting computerized work-items during traversal while ensuring cumulative resource units required for each resource category to complete the output prioritized list of computerized work-items are less than the maximum resource unit limit for each resource category.

In some embodiments, there is one uniform resource category with the plurality of computerized work-items having an estimate specified in a number of resources, which when executed by a processor, causes traversal of the sorted list of computer-generated computerized work-items to generate the output prioritized list of computer-generated computerized work-items while ensuring a cumulative number of resources required to complete the output prioritized list of computer-generated computerized work-items is less than a maximum number of resources.

In some embodiments, there is one uniform resource category with the plurality of computerized work-items having an estimate specified in time units, which when executed by a processor, causes traversal of the sorted list of computer-generated computerized work-items to generate the output prioritized list of computer-generated computerized work-items while ensuring a cumulative time required to complete the output prioritized list of computer-generated computerized work-items is less than a maximum time unit limit.

In some embodiments, the method further comprises tracking of progress of the plurality of computerized work-items by determining at least one of an overall contribution reached or an overall expense accumulated using comparable bucket values associated with the plurality of computerized work-items.

In some embodiments, the method further comprises tracking of progress of the plurality of computerized work-items by determining at least one of an overall contribution reached and an overall expense accumulated using standardized bucket values derived from a computerized bucket equivalence map.

In some embodiments, the method further comprises refining an estimate of a contribution sub-component in a bucket value or a value of future planned computerized work-items using actual realized contribution obtained from at least one of (a) a usage telemetry, (b) a finer grained usage telemetry and (c) a quality telemetry.

In some embodiments, the method further comprises refining an estimate of an expense sub-component in a bucket value or a value of future planned computerized work-items based on actual expenses incurred in performing similar computer-generated computerized work-items.

In some embodiments, the method further comprises the steps of (a) obtaining, using an input master list pane of a graphical user interface, the input master list of a plurality of computerized work-items, (b) processing a selection of computer-executable rules using a search icon and add icon based on inputs received at a rules initialization pane of the graphical user interface, and (c) displaying, at an output prioritized list pane of the user interface, the output prioritized list of computerized work-items for prioritizing work based on prioritized computer-executable rules.

The method provides a framework to link contributions and expenses associated with prioritized computer-executable rules with the plurality of computerized work-items and also provides an approach to measure progress of the plurality of computerized work-items against desired computer-executable rules. These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIGS. 4A and 4B are flow diagrams of a method for generation of an output prioritized list of computerized work-items for prioritizing work based on a set of prioritized computer-executable rules, according to some embodiments herein;

FIGS. 5A and 5B are interaction diagrams of a method for generation of an output prioritized list of computerized work-items for prioritizing work based on a set of prioritized computer-executable rules, according to some embodiments herein;

FIG. 6 is a schematic diagram of a computer architecture, in accordance with the embodiments herein.

DETAILED DESCRIPTION

Figure 1:
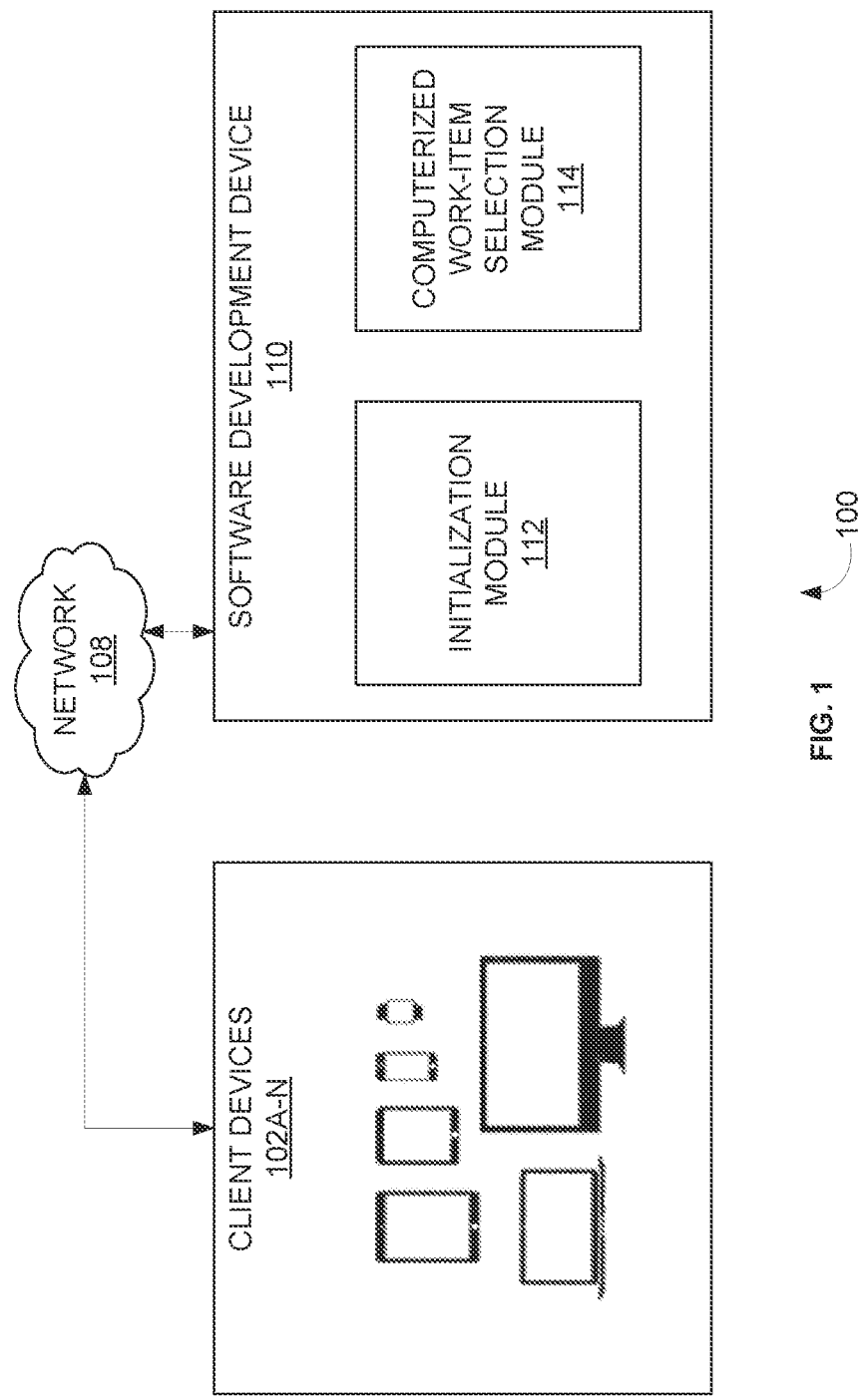
FIG. 1 illustrates a system for generation of an output prioritized list of computerized work-items for prioritizing work based on a set of prioritized computer-executable rules, according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system and method for generation of a prioritized list of computerized work-items for prioritizing work based on a set of prioritized computer-executable rules. Referring now to the drawings, and more particularly to FIGS. 1 to 7, where similar reference characters denote corresponding features consistently throughout the figures, exemplary embodiments are shown.

As used herein the term "work-item" is defined as a computerized documented task, activity, or action that needs to take place in an organization that is executed by one or more resource units belonging to different resource categories, and the estimates of required resource units for each resource category are associated with the work-item during planning that happens before execution.

FIG. 1 illustrates a system 100 system for generation of an output prioritized list of computerized work-items for prioritizing work based on a set of prioritized computer-executable rules, according to some embodiments herein. The system 100 includes one or more client devices 102A-N (where N is a positive integer) that comprise the plurality of distinct software development applications.

The one or more client devices 102A-N are connected via a network 108 to a software development device 110 that comprises an initialization module 112 and a computerized work-item selection module 114. The software development device 110, which may be a computer, may be configured to obtain the set of prioritized computer-executable rules, a default electronic priority order of (i) a plurality of contribution sub-components and (ii) a plurality of expense sub-components that are associated with the plurality of computerized work-items, a plurality of resource categories, and a maximum resource unit limit for each of the plurality of resource categories from the one or more client device 102A-N, where each computerized work-item has an estimate of required resource units for each resource category that is determined using a product of a number of resources and a number of time units. The software development device 110 may determine an electronic priority order of each of the plurality of contribution sub-components and the plurality of expense sub-components based on a prioritized computer-executable rule corresponding to the plurality of contribution sub-components and expense sub-components, where a contribution sub-component or expense sub-component at the top in the electronic priority order corresponds to a computer-executable rule having a highest priority, where a contribution sub-component or expense sub-component with no associated prioritized computer-executable rule is assigned a lower priority than the plurality of contribution sub-components or expense sub-components that are associated with at least one of the set of prioritized computer-executable rules, where the lower priority is derived from the default electronic priority order. The software development device 110 may generate a tuple comprising contribution sub-components and expense sub-components for each of the plurality of computerized work-items of the input master list, where contribution sub-components and expense sub-components in the tuple are arranged based on the electronic priority order. The software development device 110 may sort the plurality of computerized work-items of the input master list in descending order of the contribution and expense sub-component tuples to obtain a sorted list of computerized work-items, where a computerized work-item having same value up to a $n^{th}$ (a positive integer) contribution sub-component or expense sub-component of the computerized work-item is sorted by a value of $(n+1)^{th}$ contribution sub-component or expense sub-component of the computerized work-item. The software development device 110 may traverse the sorted list of computerized work-items to generate the output prioritized list of computerized work-items for prioritizing work based on prioritized computer-executable rules, selecting computerized work-items during traversal while ensuring cumulative resource units required for each resource category to complete the output prioritized list of computerized work-items are less than the maximum resource unit limit for each resource category. The software development device 110 may transmit the output prioritized list of computerized work-items for prioritizing work based on prioritized computer-executable rules.

The system 100 provides a framework to link contributions and expenses associated with prioritized computer-executable rules with the plurality of computerized work-items.

"Computer-executable rules" may be specified as stand-alone or specified through more elaborate mechanisms, for example, by using a Objectives and Key Results (OKR) framework which comprises objectives or computer-executable rules and multiple key results for each computer-executable rule that may be updated on a periodic basis.

The system 100 provides an approach to measure progress of the plurality of computerized work-items against desired computer-executable rules of an organization.

In some embodiments, progress of the plurality of computerized work-items is tracked by determining at least one of an overall contribution reached and an overall expense accumulated using standardized bucket values derived from a computerized bucket equivalence map.

In some embodiments, progress of the plurality of computerized work-items is tracked by determining at least one of an overall contribution reached or an overall expense accumulated using comparable bucket values associated with the plurality of computerized work-items.

Figure 2:
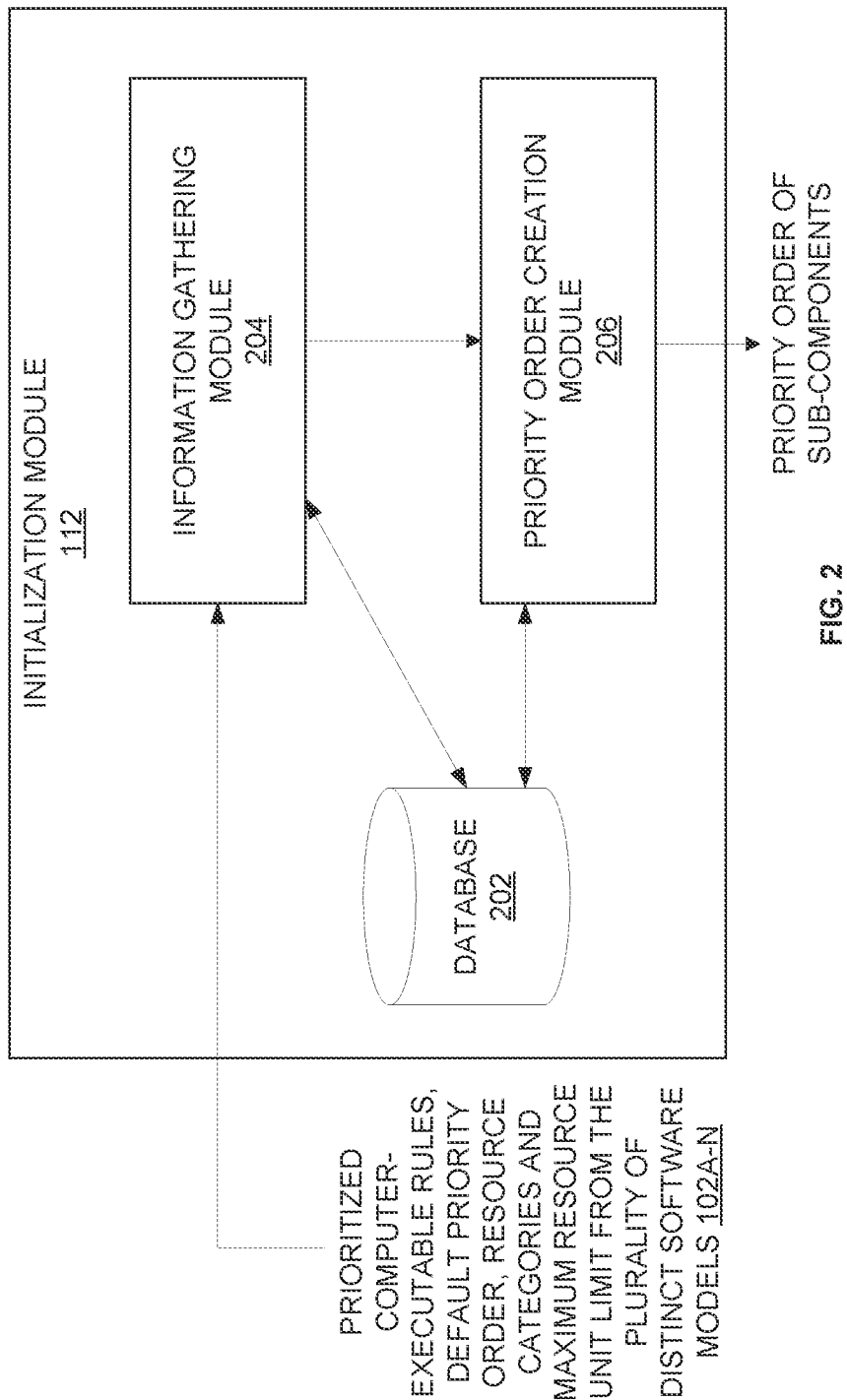
FIG. 2 illustrates an exploded view of an initialization module of FIG. 1, according to some embodiments herein.

FIG. 2 illustrates an exploded view of the initialization module 112 of FIG. 1, according to some embodiments herein. The initialization module 112 comprises a database 202, an information gathering module 204 and a priority order creation module 206. The information gathering module 204 obtains, from the one or more client device 102A-N, the set of prioritized computer-executable rules, a default electronic priority order of (i) a plurality of contribution sub-components and (ii) a plurality of expense sub-components that are associated with the plurality of computerized work-items, a plurality of resource categories, and a maximum resource unit limit for each of the plurality of resource categories, wherein each computerized work-item has an estimate of required resource units for each resource category that is determined using a product of a number of resources and a number of time units and stored in the database 202. For example, the resource categories for software development teams may include, but are not limited to, a user interface developer, a back-end developer, a data scientist, a program manager, a quality assurance engineer.

In some embodiments, each computerized work-item is tagged with (a) kind of resources that are required to complete that computerized work-item as captured by the resource category and (b) an estimate of resource units required for each resource category. The total resource units for each of the plurality of resource categories is initialized to zero.

The priority order creation module 206 determines an electronic priority order of each of the plurality of contribution sub-components and the plurality of expense sub-components based on a prioritized computer-executable rule corresponding to the plurality of contribution sub-components and expense sub-components, wherein a contribution sub-component or expense sub-component at the top in the electronic priority order corresponds to a computer-executable rule having a highest priority in the electronic priority order, wherein a contribution sub-component or expense sub-component with no associated prioritized computer-executable rule is assigned a lower priority than the plurality of contribution sub-components or expense sub-components that are associated with at least one of the set of prioritized computer-executable rules, wherein the lower priority is derived from the default electronic priority order.

Examples of the plurality of contribution sub-components are described in

TABLE 1

Contribution sub-components

| No. | Contribution sub-component | Contribution specified as |
|---|---|---|
| 1. | Expected revenue impact | Bucket category or numerical value |
| 2. | Expected adoption (by few, most, or all users) | Bucket category |
| 3. | Expected impact on overall product adoption | Bucket category |
| 4. | Expected improvement in product quality | Bucket category |
| 5. | Expected impact on customer satisfaction | Bucket category |
| 6. | Expected engineering efficiency savings | Bucket category or numerical value |
| 7. | Expected improvements to employee productivity | Bucket category |
| 8. | Expected impact on employee engagement | Bucket category |
| 9. | Value for Marketing (includes Time to Market considerations) | Bucket category or numerical value |
| 10. | Value for Sales (includes consideration for new sales, renewals, or expansions) | Bucket category or numerical value |

TABLE 1-continued

Contribution sub-components

| No. | Contribution sub-component | Contribution specified as |
|---|---|---|
| 11. | Value as Intellectual Property (for differentiation or avoiding infringement) | Bucket category or numerical value |
| 12. | User defined contribution fields | Bucket category or numerical value |

Examples of the plurality of expense sub-components are described in the Table 2 for software development work.

TABLE 2

Expense sub-components

| No. | Expense sub-component | Expense specified as |
|---|---|---|
| 1. | Engineering Resources (can use "Time + Resource Category -> numerical value" conversion map) | Bucket category or numerical value |
| 2. | Hardware/Software (to cover required hardware/software for hosting or development) | Bucket category or numerical value |
| 3. | Legal (ex. to cover non-fulfillment expenses related to contract or SLA breach) | Bucket category or numerical value |
| 4. | Other (ex. to cover negative impact to other areas due to reallocation of resources or hiring related expenses of needed resources) | Bucket category or numerical value |
| 5. | User defined expense fields | Bucket category or numerical value |

Bucket categories like "low, medium, high" or "XS, S, M, L, XL" may be used for expected contributions and expenses instead of specific numerical value.

In some embodiments, a team that is not directly involved in software development may have their own list of contribution and expense sub-components.

Regardless of the way the computer-executable rules are specified, most desired outcomes for an organization may be mapped to the same contribution and expense sub-components as described in Table 3 for software development work.

TABLE 3

Computer-executable rules

| Computer-executable rules | Relevant contribution or expense sub-component |
|---|---|
| Increasing Revenue | Expected revenue impact contribution sub-component |
| Increasing Product adoption/Market share | Expected adoption, Expected impact on overall product adoption contribution sub-component |
| Increasing Product quality | Expected improvement in product quality contribution sub-component |
| Increasing Customer satisfaction | Expected impact on customer satisfaction contribution sub-component |
| Increasing Employee productivity | Expected improvements to employee productivity contribution sub-component |
| Increasing Employee engagement | Expected impact on employee engagement contribution sub-component |
| Increasing Marketing generated leads | Value for Marketing contribution sub-component |
| Increasing Customers (including renewals/expansion) | Value for Sales contribution sub-component |
| Increasing Intellectual Property | Value as Intellectual Property |
| Reducing Engineering expense | Engineering expense sub-component- Expected engineering efficiency savings contribution sub-component |
| Reducing Hardware/ Software expense | Hardware/Software expense sub-component |
| Reducing Legal expense | Legal expense sub-component |
| Reducing Overall expense | Engineering + Hardware/Software + Legal + Other expense sub-components |

Figure 3:
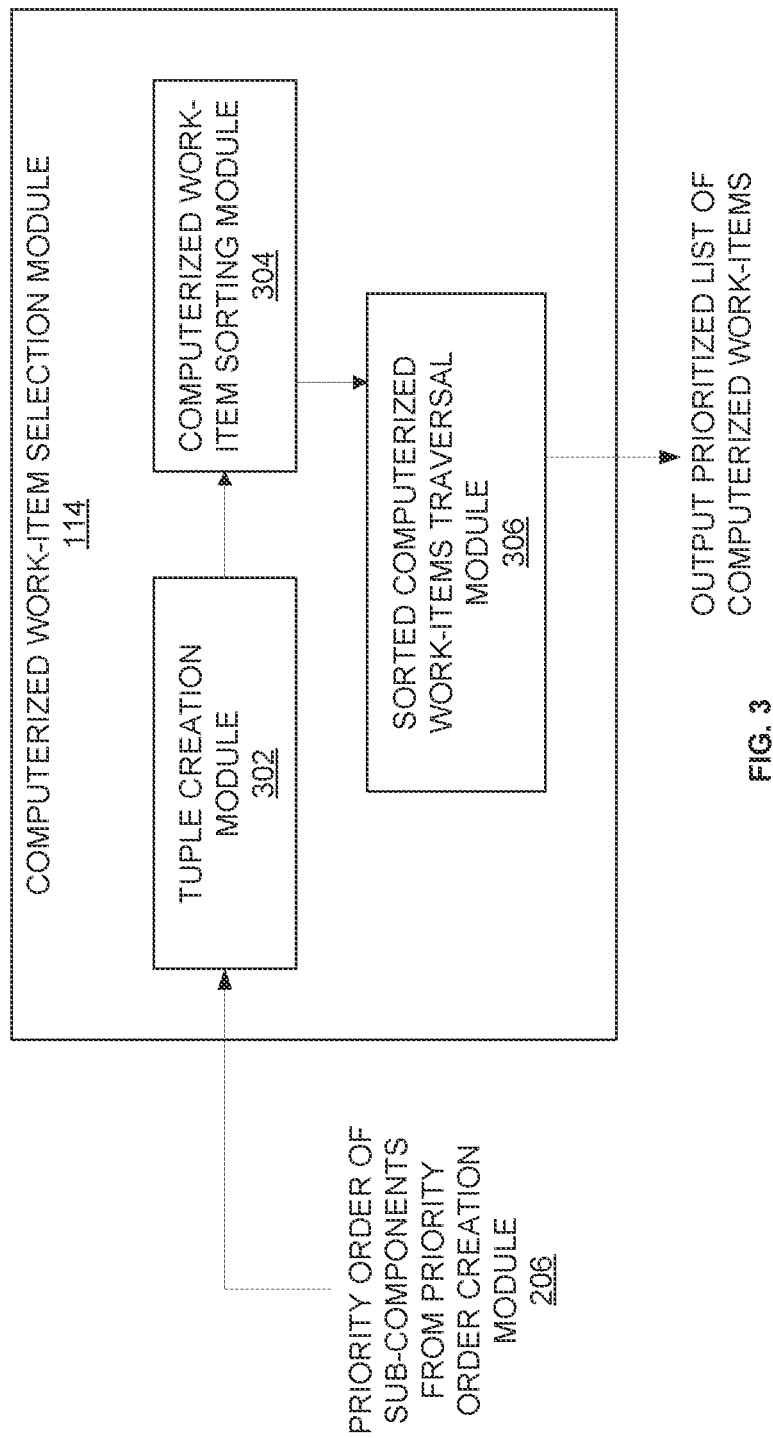
FIG. 3 illustrates an exploded view of a computerized work-item selection module of FIG. 1, according to some embodiments herein.

FIG. 3 is an exploded view of the computerized work-item selection module 114 of FIG. 1 according to some embodiments herein. The computerized work-item selection module 114 comprises a tuple creation module 302, a computerized work-item sorting module 304 and a sorted computerized work-items traversal module 306. The tuple creation module 302 obtains electronic priority order of each of the plurality of contribution sub-components and the plurality of expense sub-components from the priority order creation module 206. The tuple creation module 302 generates a tuple comprising contribution sub-components and expense sub-components for each of the plurality of computerized work-items of the input master list, wherein contribution sub-components and expense sub-components in the tuple are arranged based on the electronic priority order. The computerized work-item sorting module 304 sorts the plurality of computerized work-items of the input master list in descending order of the contribution and expense sub-component tuples to obtain a sorted list of computerized work-items, wherein a computerized work-item having same value up to a nth (a positive integer) contribution sub-component or expense sub-component of the computerized work-item is sorted by a value of $(n+1)^h$ contribution sub-component or expense sub-component of the computerized work-item.

The sorted computerized work-items traversal module 306 traverses the sorted list of computerized work-items to generate the output prioritized list of computerized work-items for prioritizing work based on prioritized computer-executable rules, selecting computerized work-items during traversal while ensuring cumulative resource units required for each resource category to complete the output prioritized list of computerized work-items are less than the maximum resource unit limit for each resource category. If a computerized work-item requires a resource category that has already reached the maximum resource unit limit for that category, that computerized work-item cannot be selected, and so, is skipped and traversing the sorted list continues to the next computerized work-item. Traversing the sorted list stops as soon as the cumulative resource units needed reaches the maximum resource units limit for each resource category or there are no more computerized work-items.

In some embodiments, there is one uniform resource category with the plurality of computerized work-items having an estimate specified in a number of resources, which when executed by a processor, causes traversal of the sorted list of computerized work-items to generate the output prioritized list of computerized work-items while ensuring a cumulative number of resources required to complete the output prioritized list of computerized work-items is less than a maximum number of resources.

In some embodiments, there is one uniform resource category with the plurality of computerized work-items having an estimate specified in time units, which when executed by a processor, causes traversal of the sorted list of computerized work-items to generate the output prioritized list of computerized work-items while ensuring a cumulative time required to complete the output prioritized list of computerized work-items is less than a maximum time unit limit.

In some embodiments, progress of the plurality of computerized work-items is tracked by determining at least one of an overall contribution reached and an overall expense accumulated using standardized bucket values derived from a computerized bucket equivalence map.

In some embodiments, progress of the plurality of computerized work-items is tracked by determining at least one of an overall contribution reached or an overall expense accumulated using comparable bucket values associated with the plurality of computerized work-items.

If the contribution or expense sub-components are specified as numerical amounts, both the "overall contribution reached" and "overall expense accumulated" would be simple sum computations.

In some embodiments, the contribution or expense sub-components are not numerical values but are in bucket category values that are comparable across the contribution or expense sub-components, in which case the "overall contribution reached" and the "overall expense accumulated" may be determined in terms of the comparable bucket values. Optionally, if the bucket values are not comparable, a bucket equivalence map may be used to relate bucket values of different contribution/expense sub-components to each other. As an example, for a "low, medium, high" bucket, the map may establish equivalence between 'low' for a sub-component like 'expected adoption' and 'low' for another sub-component like 'expected impact on customer satisfaction'. Then the "overall contribution reached" and "overall expense accumulated" may be determined in terms of standardized bucket values.

In some embodiments, an estimate of a contribution sub-component in a bucket value or a numerical value of future planned computerized work-items is refined using actual realized contribution obtained from at least one of (a) a usage telemetry, (b) a finer grained usage telemetry and (c) a quality telemetry. An estimate of an expense sub-component in a bucket value or a numerical value of future planned computerized work-items may be refined based on actual expenses incurred in performing similar computerized work-items. The numerical amounts or buckets associated with contribution sub-components of computerized work-items are expectations or projections created for planning purposes. For certain computerized work-item contribution sub-components like feature/product adoption or product quality, telemetry may provide an actual value. Usage telemetry may enable quantifying feature adoption and impact on overall product adoption. Finer grained usage telemetry may provide insights into usage frequency and variation of usage over time by different groups. The finer grained usage telemetry may also enable identifying whether a feature was tried but subsequently dropped from being used actively. The quality telemetry (capturing crashes, logged errors, customer reported bugs) may enable quantifying improvement in product quality. To measure actual realized contribution, information on outcomes desired by an organization may be gathered from software tools that are used by the organization for tracking those different outcomes. As an examples, software tools may include, but are not limited to, Salesforce® software for sales, NetSuite® software for expense and revenue, Marketo® software for marketing related information, Zendesk® software to augment quality telemetry, and Pendo® software for customer satisfaction information. The measured realized values from telemetry or tools may guide setting of bucket or numerical values of contribution sub-components of future similar computerized work-items in a similar manner as actual expense incurred in performing the computerized work-items guides setting of bucket or numerical values for expense sub-components of future similar computerized work-items. FIGS. 4A and 4B are flow diagrams of a method for generation of an output prioritized list of computerized work-items for prioritizing work based on a set of prioritized computer-executable rules, according to some embodiments herein. At step 402, the method comprises obtaining the set of prioritized computer-executable rules, a default electronic priority order of (i) a plurality of contribution sub-components and (ii) a plurality of expense sub-components that are associated with the plurality of computerized work-items, a plurality of resource categories, and a maximum resource unit limit for each of the plurality of resource categories, where each computerized work-item has an estimate of required resource units for each resource category that is determined using a product of a number of resources and a number of time units. At step 404, the method comprises determining an electronic priority order of each of the plurality of contribution sub-components and the plurality of expense sub-components based on a prioritized computer-executable rule corresponding to the plurality of contribution sub-components and expense sub-components, where a contribution sub-component or expense sub-component at the top in the electronic priority order corresponds to a computer-executable rule having a highest priority, where a contribution sub-component or expense sub-component with no associated prioritized computer-executable rule is assigned a lower priority than the plurality of contribution sub-components or expense sub-components that are associated with at least one of the set of prioritized computer-executable rules, where the lower priority is derived from the default electronic priority order. At step 406, the method comprises generating a tuple comprising contribution sub-components and expense sub-components for each of the plurality of computerized work-items of the input master list, where contribution sub-components and expense sub-components in the tuple are arranged based on the electronic priority order. At step 408, the method comprises sorting the plurality of computerized work-items of the input master list in descending order of the contribution and expense sub-component tuples to obtain a sorted list of computerized work-items, where a computerized work-item having same value up to a $n^{th}$ (a positive integer) contribution sub-component or expense sub-component of the computerized work-item is sorted by a value of $(n+1)^{th}$ contribution sub-component or expense sub-component of the computerized work-item. At step 410, the method comprises traversing the sorted list of computerized work-items to generate the output prioritized list of computerized work-items for prioritizing work based on prioritized computer-executable rules, selecting computerized work-items during traversal while ensuring cumulative resource units required for each resource category to complete the output prioritized list of computerized work-items are less than the maximum resource unit limit for each resource category.

Figure 5A:
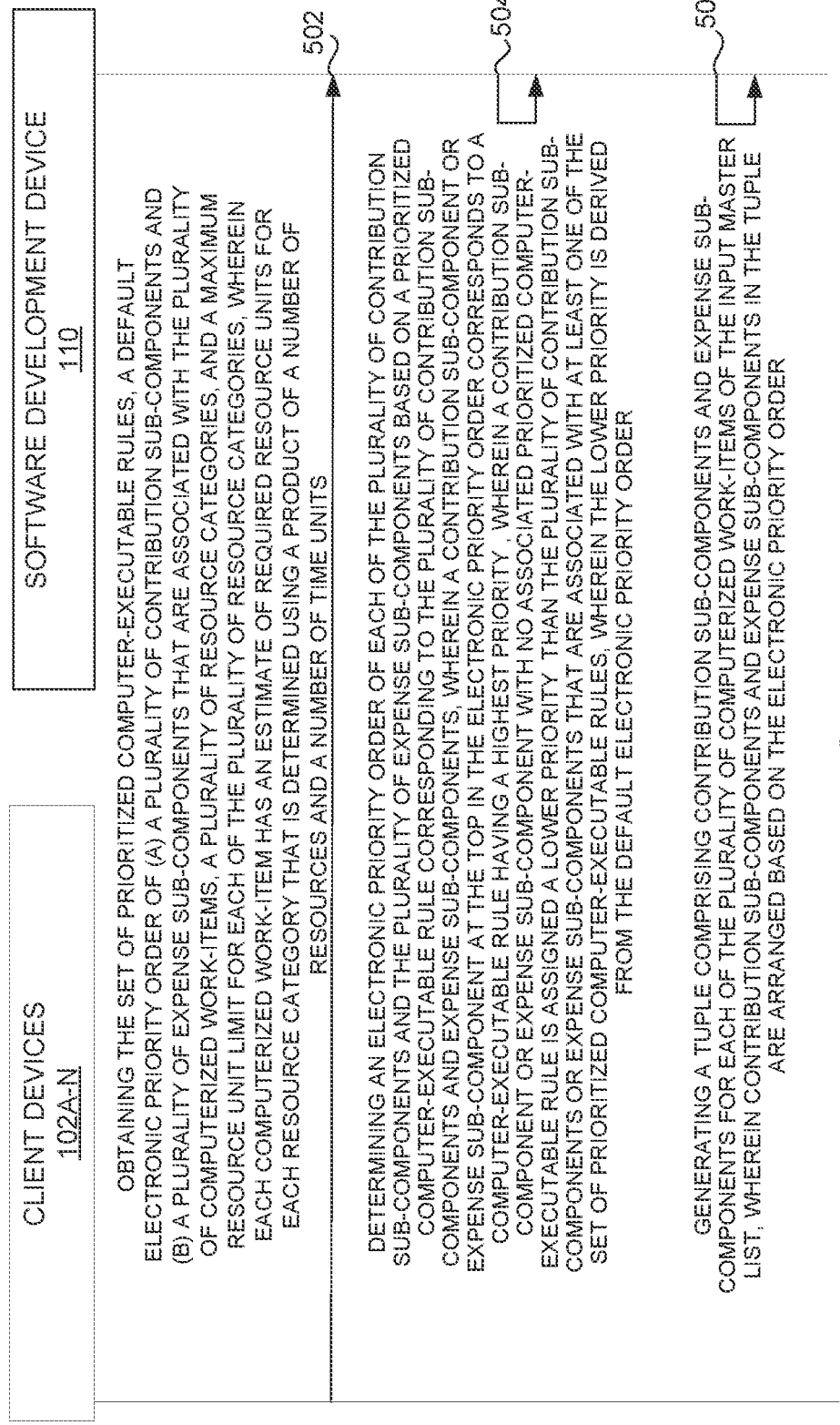

FIGS. 5A and 5B are an interaction diagram of a method for generation of an output prioritized list of computerized work-items for prioritizing work based on a set of prioritized computer-executable rules, according to some embodiments herein. At step 502, the set of prioritized computer-executable rules, a default electronic priority order of (i) a plurality of contribution sub-components and (ii) a plurality of expense sub-components that are associated with the plurality of computerized work-items, a plurality of resource categories, and a maximum resource unit limit for each of the plurality of resource categories are obtained from the one or more client devices 102A-N, where each computerized work-item has an estimate of required resource units for each resource category that is determined using a product of a number of resources and a number of time units. At step 504, an electronic priority order of each of the plurality of contribution sub-components and the plurality of expense sub-components based on a prioritized computer-executable rule corresponding to the plurality of contribution sub-components and expense sub-components is determined, where a contribution sub-component or expense sub-component at the top in the electronic priority order corresponds to a computer-executable rule having a highest priority, where a contribution sub-component or expense sub-component with no associated prioritized computer-executable rule is assigned a lower priority than the plurality of contribution sub-components or expense sub-components that are associated with at least one of the set of prioritized computer-executable rules, where the lower priority is derived from the default electronic priority order. At step 506, a tuple comprising contribution sub-components and expense sub-components for each of the plurality of computerized work-items of the input master list is generated, where contribution sub-components and expense sub-components in the tuple are arranged based on the electronic priority order. At step 508, the plurality of computerized work-items of the input master list are sorted in descending order of the contribution and expense sub-component tuples to obtain a sorted list of computerized work-items, where a computerized work-item having same value up to a $n^{th}$ (a positive integer) contribution sub-component or expense sub-component of the computerized work-item is sorted by a value of $(n+1)^{th}$ contribution sub-component or expense sub-component of the computerized work-item. At step 510, the sorted list of computerized work-items to is traversed to generate the output prioritized list of computerized work-items, selecting computerized work-items during traversal while ensuring cumulative resource units required for each resource category to complete the output prioritized list of computerized work-items are less than the maximum resource unit limit for each resource category. At step 512, the output prioritized list of computerized work-items for prioritizing work based on prioritize computer-executable rules is transmitted to the software development device 110.

The various systems and corresponding components described herein and/or illustrated in the figures may be embodied as hardware-enabled modules and may be a plurality of overlapping or independent electronic circuits, devices, and discrete elements packaged onto a circuit board to provide data and signal processing functionality within a computer. An example might be a comparator, inverter, or flip-flop, which could include a plurality of transistors and other supporting devices and circuit elements. The systems that include electronic circuits process computer logic instructions capable of providing digital and/or analog signals for performing various functions as described herein. The various functions can further be embodied and physically saved as any of data structures, data paths, data objects, data object models, object files, database components. For example, the data objects could include a digital packet of structured data. Example data structures may include any of an array, tuple, map, union, variant, set, graph, tree, node, and an object, which may be stored and retrieved by computer memory and may be managed by processors, compilers, and other computer hardware components. The data paths can be part of a computer CPU or GPU that performs operations and calculations as instructed by the computer logic instructions. The data paths could include digital electronic circuits, multipliers, registers, and buses capable of performing data processing operations and arithmetic operations (e.g., Add, Subtract, etc.), bitwise logical operations (AND, OR, XOR, etc.), bit shift operations (e.g., arithmetic, logical, rotate, etc.), complex operations (e.g., using single clock calculations, sequential calculations, iterative calculations, etc.). The data objects may be physical locations in computer memory and can be a variable, a data structure, or a function. Some examples of the modules include relational databases (e.g., such as Oracle® relational databases), and the data objects can be a table or column, for example. Other examples include specialized objects, distributed objects, object-oriented programming objects, and semantic web objects. The data object models can be an application programming interface for creating HyperText Markup Language (HTML) and Extensible Markup Language (XML) electronic documents. The models can be any of a tree, graph, container, list, map, queue, set, stack, and variations thereof, according to some examples. The data object files can be created by compilers and assemblers and contain generated binary code and data for a source file. The database components can include any of tables, indexes, views, stored procedures, and triggers.

In an example, the embodiments herein can provide a computer program product configured to include a pre-configured set of instructions, which when performed, can result in actions as stated in conjunction with various figures herein. In an example, the pre-configured set of instructions can be stored on a tangible non-transitory computer readable medium. In an example, the tangible non-transitory computer readable medium can be configured to include the set of instructions, which when performed by a device, can cause the device to perform acts similar to the ones described here.

The embodiments herein may also include tangible and/or non-transitory computer-readable storage media for carrying or having computer-executable instructions or data structures stored thereon. Such non-transitory computer readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a special purpose computer or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

The techniques provided by the embodiments herein may be implemented on an integrated circuit chip (not shown). The chip design is created in a graphical computer programming language and stored in a computer storage medium (such as a disk, tape, physical hard drive, or virtual hard drive such as in a storage access network. If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher-level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments herein is depicted in FIG. 6, with reference to FIGS. 1 through 5B. This schematic drawing illustrates a hardware configuration of a software development device/computer system 600 in accordance with the embodiments herein. The system 600 comprises at least one processor or central processing unit (CPU) 10. The CPUs 10 are interconnected via system bus 12 to various devices such as a random-access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system 600 can read the inventive instructions on the program storage devices and follow these instructions to execute the methodology of the embodiments herein. The system 900 further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network, and a display adapter 21 connects the bus 12 to a display device 23, which provides a graphical entity interface (GUI) 36 of the output data in accordance with the embodiments herein, or which may be embodied as an output device such as a monitor, printer, or transmitter, for example. Further, a transceiver 26, a signal comparator 27, and a signal converter 28 may be connected with the bus 12 for processing, transmission, receipt, comparison, and conversion of electric signals.

Figure 7:
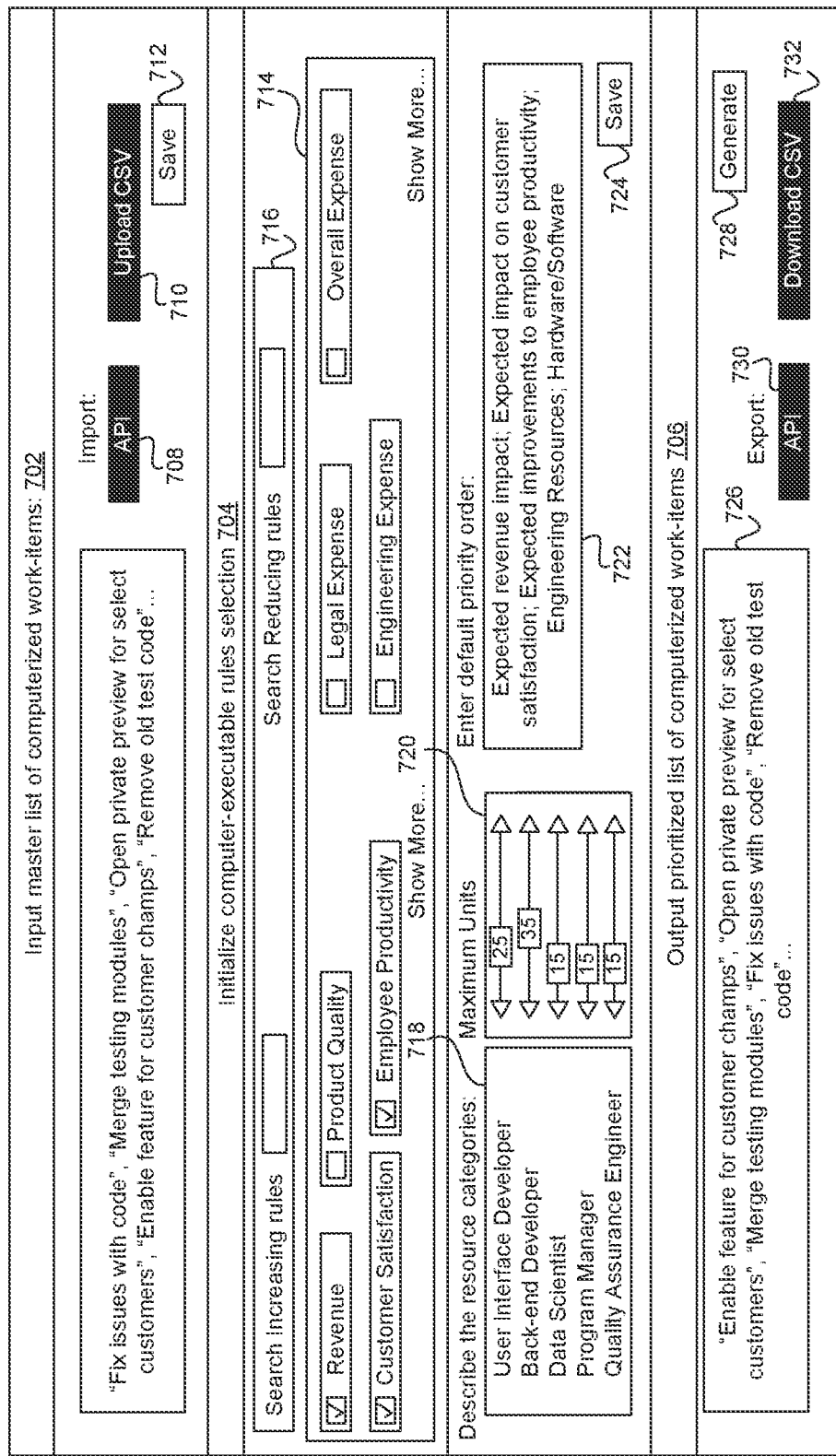
FIG. 7 is a block diagram illustrating a graphical user interface, in accordance with the embodiments herein.

FIG. 7 illustrates a graphical user interface 700 of the display device 23 of FIG. 6. The graphical user interface (GUI) 700 comprises an input master list pane 702, a rules initialization pane 704, and an output prioritized pane 706. The input master list pane 702 includes an application programming interface (API) icon 708 and an upload comma-separated value (CSV) icon 710 for importing the input master list of the plurality of computerized work-items. The API icon 708 and the upload CSV icon 710 may be configured and arranged in rectangular structured boxes and may be positioned on the right side in the input master list pane 702. The GUI 700 allows the user to obtain, using the input master list pane 702 of the GUI 700, the input master list of a plurality of computerized work-items. The plurality of computerized work-items have an estimate of required resource units for each resource. In some embodiments, the input list of the plurality of computerized work-items may be obtained from a project management tool like Atlassian Jira® or Digital.ai Agility™ via the API icon 708. The input master list pane 702 includes a save icon 712 that may be configured and arranged in rectangular structured boxes and may be positioned on the right side in the input master list pane 702. When a user clicks the save icon 712, the input master list of a plurality of computerized work-items is imported in the database 202.

The rules initialization pane 704 includes a checkbox icon 714 and a search and add icon 716 that causes searching of a computer-executable rule among a list of computer-executable rules. The list may include computer-executable rules as described in Table 3. The checkbox icon 714 has a box structure next to a presented computer-executable rule that receives a selection of the presented computer-executable rule when the user interacts with the checkbox icon 714. The search and add icon 716 may be positioned above the computer-executable rules. The GUI 700 allows the user to process a selection of computer-executable rules using the search icon and add icon 716 based on inputs received at a rules initialization pane 704 of the GUI 700. The rules initialization pane 704 includes a resource category text field 718 that allows the user to enter a list of resource categories. The rules initialization pane 704 includes a slider bar icon 720 positioned next to each resource category. The slider bar icon 720 includes a sliding text box that can be adjusted left or right upon interaction by the user and allows the user to set the maximum resource unit limit for each of the plurality of resource categories. The rules initialization pane 704 includes a default priority order text box 722 that allows the user to enter a default priority order of the plurality of contribution sub-components and the plurality of expense sub-components. The default priority order text box 722 is populated automatically as the user selects rules to be added, in the order the user selects the rules. In some embodiments, a drag and drop style ordering control may be used for allowing the user to conveniently change the order of rules after the user selects the rules. The rules initialization pane 704 includes a save icon 724 that allows the user to obtain the set of prioritized computer-executable rules, the default electronic priority order of (a) the plurality of contribution sub-components and (b) a plurality of expense sub-components that are associated with the plurality of computerized work-items, a plurality of resource categories, and a maximum resource unit limit for each of the plurality of resource categories.

The output prioritized list of computerized work-items is displayed in a text box 726 that is included in the output prioritized pane 706. The output prioritized pane 706 includes a generate icon 728 that causes traversing the sorted list of computerized work-items to generate the output prioritized list of computerized work-items for prioritizing work based on prioritized computer-executable rules, selecting computerized work-items during traversal while ensuring cumulative resource units required for each resource category to complete the output prioritized list of computerized work-items are less than the maximum resource unit limit for each resource category. The output prioritized pane 706 includes an API icon 730 and a download CSV icon 732 for exporting the output prioritized list of the plurality of computerized work-items. The API icon 730 and the download CSV icon 736 may be configured and arranged in rectangular structured boxes and may be positioned on right side in the output prioritized pane 706. In an example, the input master list pane 702, the rules initialization pane 704, and the output prioritized pane 706 may be displayed simultaneously such that their respective icons/features (708-732) may also be displayed simultaneously for selection by a user.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope.

What is claimed is:

1. A computer-implemented method for prioritizing software development work-items, the method comprising:
    obtaining prioritized computer-executable rules defining a prioritization scheme;
    acquiring a default electronic priority order of contribution sub-components and expense sub-components associated with a plurality of computerized work-items, multiple resource categories, and maximum resource unit limits for each resource category;
    determining an electronic priority order for the contribution sub-components and the expense sub-components based on the prioritized computer-executable rules;
    generating a tuple for each computerized work-item, the tuple comprising contribution sub-components and expense sub-components arranged based on the electronic priority order;
    sorting the plurality of computerized work-items in descending order of the contribution and expense sub-component tuples to obtain a sorted list of computerized work-items;
    traversing the sorted list of computerized work-items to generate an output prioritized list of computerized work-items based on the prioritized computer-executable rules, wherein the traversal includes selecting computerized work-items while ensuring cumulative resource units remain below the maximum resource unit limits for each resource category;
    storing information related to the multiple resource categories and resource unit estimates in a database;
    storing the output prioritized list of computerized work-items in the database, wherein the database is accessible by a plurality of software development tools to track progress of the computerized work-items; and
    transmitting the output prioritized list of computerized work-items to one or more client devices for executing a software development process, thereby reducing computational complexity by eliminating redundant tuple generation and sorting operations at the client devices.

2. The method of claim 1, further comprising:
    measuring a progress of the computerized work-items against desired computer-executable rules; and
    tracking an overall contribution reached and expense accumulated using standardized bucket values derived from a computerized bucket equivalence map.

3. The method of claim 1, further comprising refining estimates of contribution and expense sub-components for the computerized work-items using actual realized values obtained from telemetry and software tools.

4. The method of claim 1, further comprising refining estimates of contribution and expense sub-components by quantifying feature adoption, usage frequency, and quality improvements using telemetry tools.

5. The method of claim 1, further comprising refining estimates of contribution and expense sub-components based on actual expenses incurred in performing similar computerized work-items.

6. The method of claim 1, further comprising using a bucket equivalence map to relate bucket values of different contribution/expense sub-components to each other.

7. The method of claim 1, further comprising using a uniform resource category to ensure that cumulative resource units required for each resource category are within a maximum resource unit limit.

8. A non-transitory computer readable storage medium storing a sequence of instructions, which when executed by a processor, causes prioritizing of software development work-items, the sequence of instructions comprising:
   obtaining prioritized computer-executable rules defining a prioritization scheme;
   acquiring a default electronic priority order of contribution sub-components and expense sub-components associated with a plurality of computerized work-items, multiple resource categories, and maximum resource unit limits for each resource category;
   determining an electronic priority order for the contribution sub-components and the expense sub-components based on the prioritized computer-executable rules;
   generating a tuple for each computerized work-item, the tuple comprising contribution sub-components and expense sub-components arranged based on the electronic priority order;
   sorting the plurality of computerized work-items in descending order of the contribution and expense sub-component tuples to obtain a sorted list of computerized work-items;
   traversing the sorted list of computerized work-items to generate an output prioritized list of computerized work-items based on the prioritized computer-executable rules, wherein the traversal includes selecting computerized work-items while ensuring cumulative resource units remain below the maximum resource unit limits for each resource category;
   storing information related to the multiple resource categories and resource unit estimates in a database;
   storing the output prioritized list of computerized work-items in the database, wherein the database is accessible by a plurality of software development tools to track progress of the computerized work-items; and
   transmitting the output prioritized list of computerized work-items to one or more client devices for executing a software development process, thereby reducing computational complexity by eliminating redundant tuple generation and sorting operations at the client devices.

9. The non-transitory computer readable storage medium storing a sequence of instructions of claim 8, which when executed by the processor, further causes:
   measuring a progress of the computerized work-items against desired computer-executable rules; and
   tracking an overall contribution reached and expense accumulated using standardized bucket values derived from a computerized bucket equivalence map.

10. The non-transitory computer readable storage medium storing a sequence of instructions of claim 8, which when executed by the processor, further causes refining estimates of contribution and expense sub-components for the computerized work-items using actual realized values obtained from telemetry and software tools.

11. The non-transitory computer readable storage medium storing a sequence of instructions of claim 8, which when executed by the processor, further causes refining estimates of contribution and expense sub-components by quantifying feature adoption, usage frequency, and quality improvements using telemetry tools.

12. The non-transitory computer readable storage medium storing a sequence of instructions of claim 8, which when executed by the processor, further causes refining estimates of contribution and expense sub-components based on actual expenses incurred in performing similar computerized work-items.

13. The non-transitory computer readable storage medium storing a sequence of instructions of claim 8, which when executed by the processor, further causes using a bucket equivalence map to relate bucket values of different contribution/expense sub-components to each other.

14. The non-transitory computer readable storage medium storing a sequence of instructions of claim 8, which when executed by the processor, further causes using a uniform resource category to ensure that cumulative resource units required for each resource category are within a maximum resource unit limit.

15. A software development device that prioritizes software development work-items, the device comprising:
   a memory that stores a sequence of instructions; and
   a processor that performs the sequence of instructions comprising:
      obtaining prioritized computer-executable rules defining a prioritization scheme;
      acquiring a default electronic priority order of contribution sub-components and expense sub-components associated with a plurality of computerized work-items, multiple resource categories, and maximum resource unit limits for each resource category;
      determining an electronic priority order for the contribution sub-components and the expense sub-components based on the prioritized computer-executable rules;
      generating a tuple for each computerized work-item, the tuple comprising contribution sub-components and expense sub-components arranged based on the electronic priority order;
      sorting the plurality of computerized work-items in descending order of the contribution and expense sub-component tuples to obtain a sorted list of computerized work-items;
      traversing the sorted list of computerized work-items to generate an output prioritized list of computerized work-items based on the prioritized computer-executable rules, wherein the traversal includes selecting computerized work-items while ensuring cumulative resource units remain below the maximum resource unit limits for each resource category;
      storing information related to the multiple resource categories and resource unit estimates in a database;
      storing the output prioritized list of computerized work-items in the database, wherein the database is accessible by a plurality of software development tools to track progress of the computerized work-items; and
      transmitting the output prioritized list of computerized work-items to one or more client devices for executing a software development process, thereby reducing computational complexity by eliminating redundant tuple generation and sorting operations at the client devices.

16. The software development device of claim 15, wherein the processor further:
  measures a progress of the computerized work-items against desired computer-executable rules; and
  tracks an overall contribution reached and expense accumulated using standardized bucket values derived from a computerized bucket equivalence map.

17. The software development device of claim 15, wherein the processor further refines estimates of contribution and expense sub-components for the computerized work-items using actual realized values obtained from telemetry and software tools or by quantifying feature adoption, usage frequency, and quality improvements using telemetry tools.

18. The software development device of claim 15, wherein the processor further refines estimates of contribution and expense sub-components based on actual expenses incurred in performing similar computerized work-items.

19. The software development device of claim 15, wherein the processor further uses a bucket equivalence map to relate bucket values of different contribution/expense sub-components to each other.

20. The software development device of claim 15, wherein the processor further uses a uniform resource category to ensure that cumulative resource units required for each resource category are within a maximum resource unit limit.

\* \* \* \* \*